COUPLING UNIT FOR COMMUNICATION SYSTEMS

Filed July 28, 1948 3 Sheets-Sheet 1

INVENTORS.
Edgar W. Breisch and
Kenneth E. Doriot
BY [signature]
THEIR ATTORNEY

COUPLING UNIT FOR COMMUNICATION SYSTEMS

Filed July 28, 1948

INVENTORS.
Edgar W. Breisch and
Kenneth E. Doriot
BY
THEIR ATTORNEY

COUPLING UNIT FOR COMMUNICATION SYSTEMS

Filed July 28, 1948 3 Sheets-Sheet 3

INVENTORS.
Edgar W. Breisch and
Kenneth E. Doriot
BY
THEIR ATTORNEY

Patented Nov. 7, 1950 2,529,280

UNITED STATES PATENT OFFICE 2,529,280

COUPLING UNIT FOR COMMUNICATION SYSTEMS

Edgar W. Breisch, Edgewood, and Kenneth E. Doriot, Swissvale, Pa., assignors to The Union Switch and Signal Company, Swissvale, Pa., a corporation of Pennsylvania Application July 28, 1948, Serial No. 41,056

4 Claims. (Cl. 179—2.5)

Figure 1:
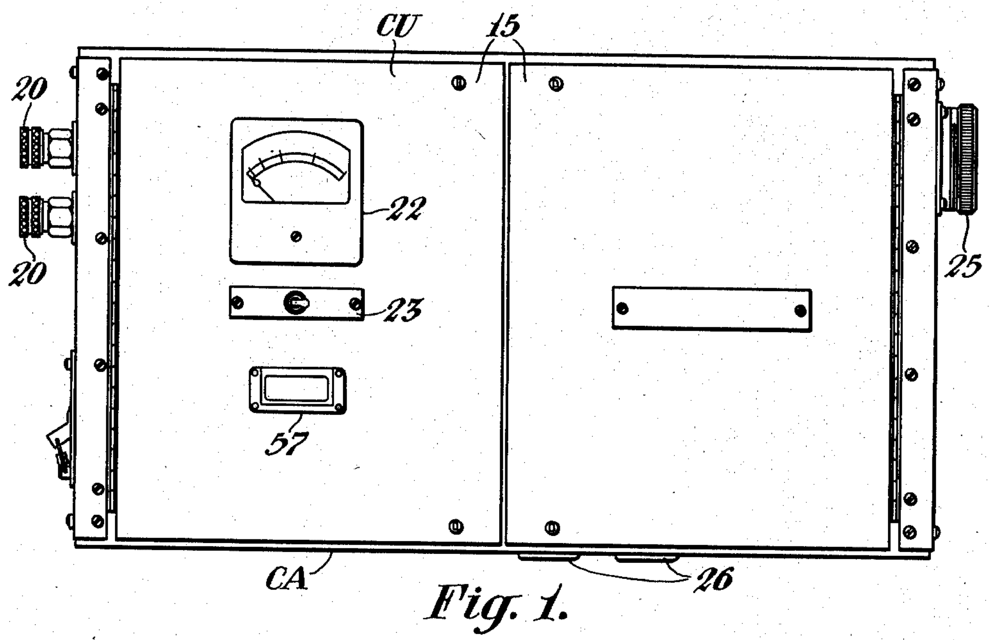

Our invention relates to a coupling unit for communication systems, and more particularly to a coupling unit for wayside stations of train communication systems of the carrier inductive type.

Railway train communication systems generally provide telephone communication between wayside stations and trains as well as communication between different trains, and between spaced vehicles of a given train. In the inductive carrier systems the line wires and other conductors paralleling the track serve as a medium for transmitting the communication current along the railway by virtue of the distributed impedance to ground, their distributed inductance and capacitance to the track rails, and their distributed capacitance and inductance to each other. In other words, the so-called longitudinal circuit formed by a line wire and its distributed impedance to ground and the ground path serve as an element of a wayside transmitting channel for inductive carrier train communication systems, the transmitting channel being made up of a number of paralleling paths. Thus, the two wires of a pair of wires strung on a pole line along a railway and used in a transverse circuit for telegraph or similar service can be used in multiple in a transmitting channel for an inductive carrier train communication system without interference with their normal use, the wires serving in a transmitting channel by virtue of the longitudinal circuit formed by the wires in multiple and their distributed impedance to ground.

The train carried transmitters and receivers of an inductive train communication system are coupled with the wayside transmitting channel by inductors and like elements mounted on the train for inductive relation with the line wires and/or the track rails. A wayside station equipment of an inductive carrier train communication system is preferably coupled to the wayside transmitting channel by being coupled to the longitudinal circuit of one or more of the line wires extending along the railway. Preferably the transmitter and receiver of a wayside station are coupled to a pair of line wires in multiple.

These carrier inductive train communication systems are not unfrequently of a multiple channel type to permit two-way telephone communication on any one of a plurality of different carrier channels. Under these conditions the means provided at a wayside station for coupling the wayside equipment to the line wires must be equally effective for each of the different carrier frequency channels that may be used.

Also, the carrier frequency used for such inductive communication systems may be of a frequency such that its harmonic components may fall within the bands used for broadcasting, and means must be provided to minimize the interference between the train communication system equipment and radio receivers within the vicinity of the railway.

It has been found that by increasing the power output of the wayside station equipment to the line wires, a gap in the line wires such as may be created by a short stretch of the pole line being down, due to a storm or to one or more of the wires being broken, may be bridged and the train communication maintained.

It has also been learned from operating experience with train telephone systems that it is often desirable to be able to record the conversation because not unfrequently important messages or messages relating to the operation of trains are transmitted.

Accordingly a feature of our invention is the provision of an improved line circuit coupling unit for communication systems.

Another feature of our invention is the provision of a train communication wayside coupling unit incorporating improved means for coupling multiple channel telephone equipments to the line wires which are elements of a transmitting channel.

Still another feature of our invention is the provision of a train communication wayside coupling unit incorporating improved means to suppress harmonic components of the communication current to keep the train communication energy from being picked up at nearby radio receivers and thereby maintain the train communication system as a private means of communication for the railroad's use only.

Again, a feature of our invention is the provision of an improved coupling unit for communication systems incorporating novel and useful means to enable the conversation to be recorded.

Another feature of our invention is the provision of an improved train communication wayside coupling unit which facilitates its mounting with respect to the housing of the wayside station telephone equipment of the system.

Another feature of our invention is the provision of a train communication wayside coupling unit incorporating novel means to enable full power to be at times delivered to the line wires to bridge a gap that may occur in the transmitting channel due to a stretch of the line wires being down or due to one or more of the line wires being broken.

Other features, objects, and advantages of our invention will appear as the specification progresses.

We attain the foregoing features, objects, and advantages of our invention by providing a coupling unit, the transformers, capacitors, inductors, control relays, and switching means of which are grouped in a cabinet of a size and appearance which are in accordance with the cabinet housing the associated wayside transmitter and receiver equipment of the communication system. In this way the coupling unit can be mounted for convenient circuit connections to the telephone equipment and to be accessible to the maintainer in making any adjustment necessary. Also, the cabinet of the unit is provided with jacks so that a recording device can easily and quickly be plugged in for recording the messages transmitted over the train telephone equipment.

The transformers, inductors, and capacitors, as well as the other elements of the coupling unit, are arranged and designed for effective coupling of the associated telephone equipment to line wires so that substantially the same efficiency is obtained for each of the different carrier channels that may be used. Also, the coupling unit is provided with suppression means for suppressing harmonic components of the carriers used to avoid reception of the train communication energy at nearby radio receivers. Furthermore, the coupling unit is arranged to enable the operator to supply additional power, above that ordinarily required, to the line wires for bridging gaps that may occur in the transmitting channel.

We shall describe one form of a coupling unit for communication systems embodying our invention and shall then point out the novel features thereof in claims.

Figure 2:
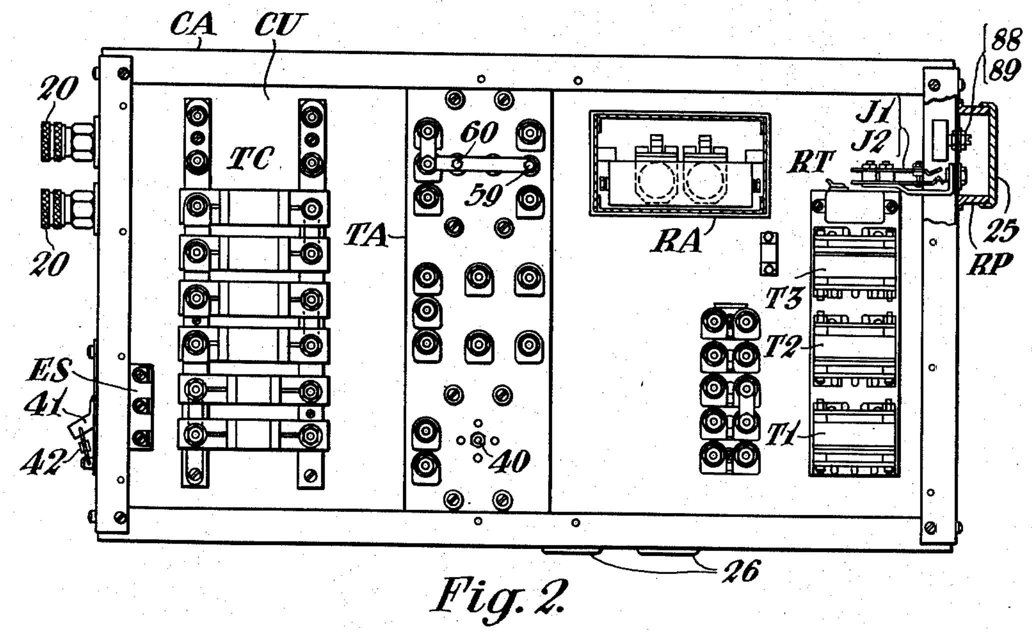
Figure 3:
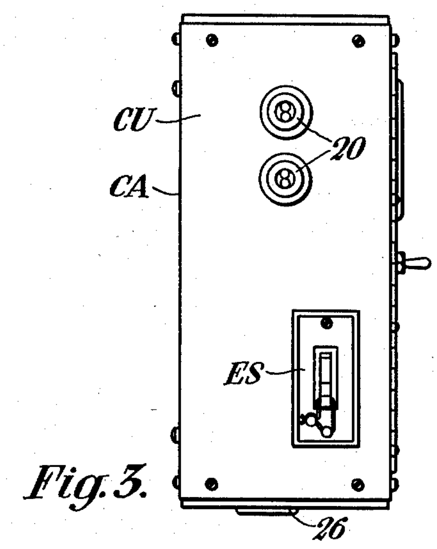
Figure 4:
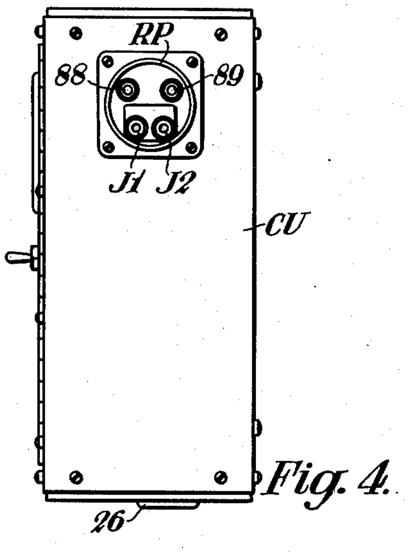
Figure 5:
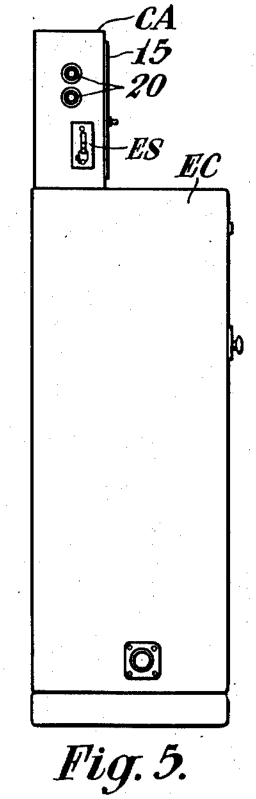
Figure 6:
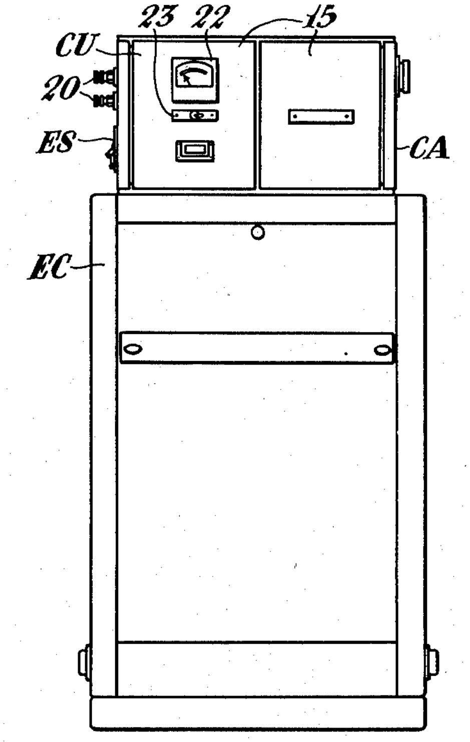
Figure 7:
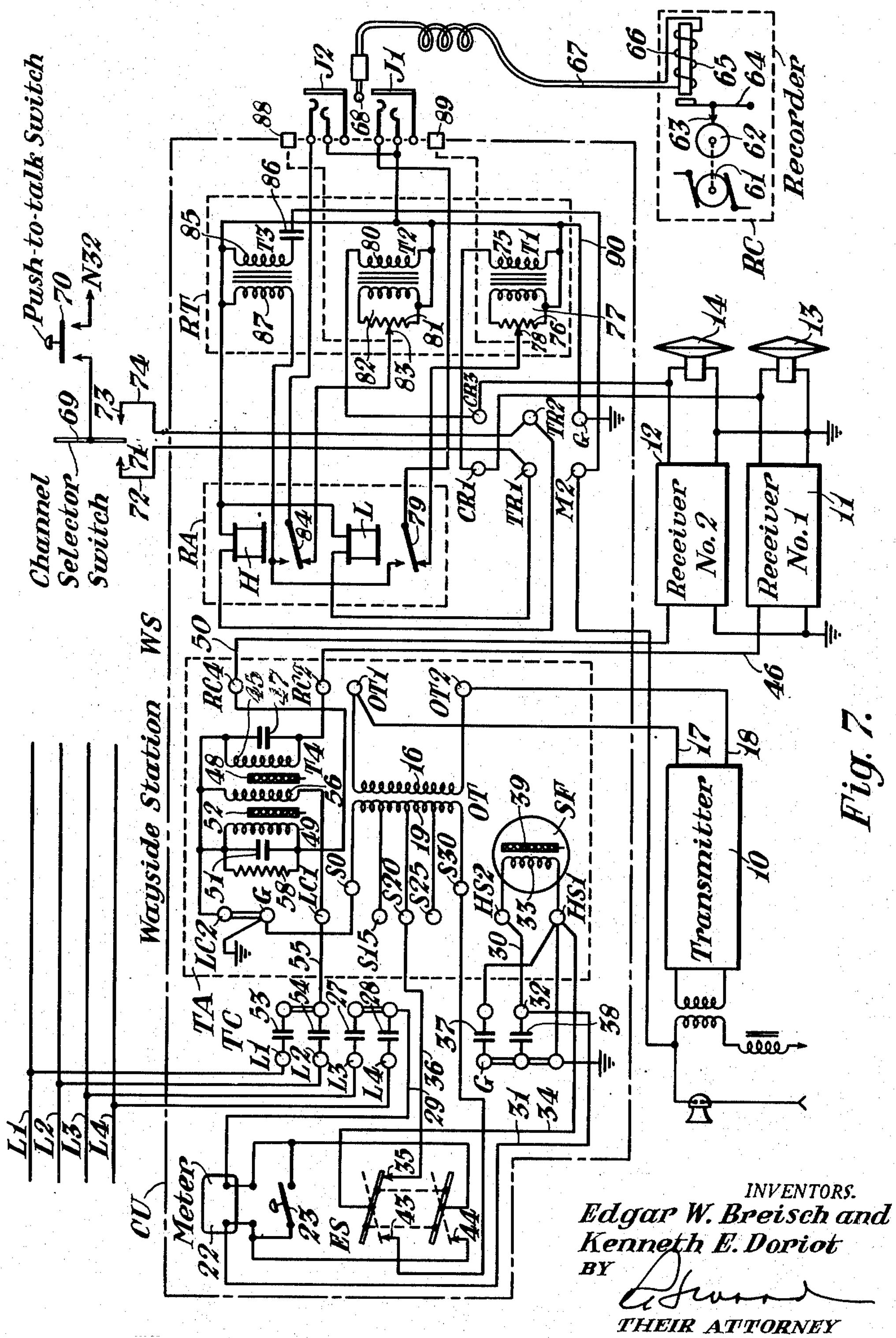

In the accompanying drawings, Fig. 1 shows a front view of a wayside station coupling unit embodying our invention when used at a wayside station of a two-channel carrier inductive train communication system. Fig. 2 shows a front view of the coupling unit of Fig. 1 with the door or front panel of the cabinet removed. Figs. 3 and 4 show the side views of the coupling unit of Fig. 1. Figs. 5 and 6 are side and front views, respectively, showing a preferred mounting of the coupling unit of Fig. 1 with respect to the usual station equipment cabinet. Fig. 7 is a diagrammatic view showing the circuits and the various elements of the coupling unit of Figs. 1, 2, 3, and 4.

In each of the different views like reference characters are used to designate similar parts.

Referring to Figs. 1, 2, 3, and 4, a coupling unit embodying our invention is designated by the reference character CU, and which unit is housed in a cabinet CA of any suitable material. This cabinet CA is of dimensions suitable to house the elements of the coupling unit and as shown in Figs. 5 and 6, the cabinet CA is designed to be secured in any suitable manner to the top of a cabinet EC in which the wayside station equipment of an associated train communication system is housed. This mounting of the cabinet CA permits the connections from the terminals of the equipment to terminals of the coupling unit CU to be readily run through bushed openings formed in the top panel of the equipment cabinet EC and bushed openings 26 in the bottom panel of the coupling unit cabinet CA and thereby greatly facilitate the wiring.

The cabinet CA is formed with hinged front panels or doors 15 to give ready access to the various elements of the unit. A testing meter 22, to be referred to hereinafter, together with a meter switch 23, are mounted on the front panel 15. The left-hand side as viewed in Figs. 1 and 2 of the cabinet CA is provided with outlets 20 through which line wire connections enter the unit. There is also provided at this end of the cabinet an emergency switch ES to be described hereinafter. At the right-hand end of the cabinet CA a receptacle RP is mounted. The receptacle RP is provided with a pair of telephone jacks J1 and J2, together with adjustments 88 and 89 of potentiometers to be referred to hereinafter, the receptacle RP being preferably provided with a cover 25.

As best shown in Fig. 2, the coupling unit CU includes a terminal and capacitor assembly TC, a transformer and filter assembly TA, a control relay assembly RA, a recording transformer assembly RT, and the emergency switch ES as essential elements, and which elements are mounted in the cabinet CA in a manner to facilitate the circuit connections thereof and for each element to be readily accessible for inspection, testing, and adjustment.

As an aid in the understanding of the coupling unit CU, the train communication equipment with which the unit can be used will be briefly described. This train communication equipment may be any one of several different forms and for the purpose of illustration it will be considered as being similar to the equipment disclosed in a copending application for Letters Patent of the United States, Serial No. 575,311, filed January 30, 1945 by P. N. Bossart, for Railway Train Communication Systems, and to which Bossart application reference is made for a full understanding of such train communication equipment, the Bossart application and the present application being of common ownership.

It is sufficient for the present application to point out that as shown conventionally in Fig. 7, the train communication equipment at a wayside station WS includes a transmitter 10 and a first and a second receiver 11 and 12, together with suitable power sources and control devices not shown. This equipment uses frequency modulation and it is capable of two-way communication on either a first channel frequency $f1$ or on a second channel frequency $f2$. Normally, that is during non-communication periods, both receivers 11 and 12 are energized ready to receive a message and the transmitter 10 is deenergized. When a call or message of the first channel frequency $f1$ is received, the current is amplified and demodulated at receiver 11 and the message is sounded in a loud-speaker 13 or some other equivalent form of sound reproducer. When a call or message on the second channel frequency $f2$ is received, the current is amplified and demodulated at receiver 12 and the message sounded in a loud-speaker 14. A two-way conversation on the first channel frequency $f1$ is effected by the operator at the station conditioning the transmitter 10 for supplying current of the carrier frequency $f1$ and the transmitter 10 and receiver 11 being alternately energized through a push-to-talk switch of the equipment, the receiver 11 being energized during reception and the transmitter 10 being energized during transmission. Similarly, a two-way conversation on the second channel frequency $f2$ is effected by the operator conditioning the transmitter 10 to supply the carrier $f2$ and by using the push-to-talk switch to selectively energize the transmitter 10 and the receiver 12.

In Fig. 7, four line wires L1, L2, L3, and L4 are shown adjacent the wayside station WS. These line wires would be wires ordinarily strung on a pole line extending along the railway right-of-way for the wires to be included in the transmitting channel of the train communication system in the manner described hereinbefore in connection with systems of the type herein involved. The line wires L1 and L2 of these four line wires are here considered as being a pair of line wires of a telegraph or similar line circuit and line wires L3 and L4 as being a second pair of line wires of a similar telegraph line circuit. Each of the line wires L1, L2, L3, and L4 is provided with a connection to a terminal of the coupling unit CU which unit in Fig. 7 is indicated as a whole by a dot-and-dash rectangle. The terminals to which the line wire connections are made in the unit CU are identified each by the reference character corresponding to that of the associated line wire. The line wire connections would be carried into the cabinet through the outlets 20 referred to hereinbefore. These terminals of the coupling unit CU, as well as other terminals referred to hereinafter, are preferably of the standard form used in railway signal work and are indicated in Fig. 7 conventionally by a circle.

The transmitter 10 of the wayside station WS is coupled to the pair of line wires L3 and L4 in multiple through a circuit connection including elements of the assemblies TA and TC of the coupling unit. An output transformer OT of the assembly TA is provided with a primary winding 16 connected to terminals OT1 and OT2 of that assembly, and across which terminals the output of the transmitter 10 is connected by wires 17 and 18, these wires being run through the bushed openings 26 of the two cabinets. A secondary winding 19 of transformer OT is provided with a series of tap connections or intermediate terminals S15, S20, and S25 in addition to the end terminals SO and S30, the numerals used with these terminals indicating the relative number of turns of the secondary winding 19 to which the terminal is connected.

Two capacitors 27 and 28 of the assembly TC are connected across the terminals L3 and L4, which as explained hereinbefore are connected to line wires L3 and L4. The junction terminal of the capacitors 27 and 28 is connected to the intermediate terminal S20 of the secondary winding 19 of transformer OT through wire 29, ammeter 22, wire 31, terminal 32, wire 30, terminal HS2, winding 33 and terminal HS1 of a filter or suppressor SF to be described hereinafter, wire 34, a contact 35 of the emergency switch ES and wire 36. The end terminal SO of secondary winding 19 is connected to a ground terminal G of the assembly TA. It follows from the foregoing that electromotive forces induced in that portion of secondary winding 19 connected across the end terminal SO and the intermediate terminal S20 due to communication current supplied from transmitter 10 to the primary winding 16 of transformer OT are impressed between the line wires L3 and L4 in multiple and ground and the corresponding communication current is caused to flow in the transmitting channel used by the train communication system.

The meter 22 interposed at this connection of the transmitter 10 is provided with a short circuiting switch 23 as will be readily understood by an inspection of Fig. 7, the switch here illustrated as being open would normally be closed to protect the meter. For test purposes the switch 23 is opened to allow full line current to flow through the meter and enable the operator to determine if the line current is within that specified for this particular wayside station, the designated magnitude of the line current being usually indicated on a record card inserted in a holder 57 located on the front panel 15 of the cabinet CA. With this convenient method of checking, the maintainer can make any adjustment necessary in the coupling unit to keep the output current within the prescribed limit predetermined by the system.

The element SF and capacitors 37 and 38 serve as a filter to suppress the harmonic components of the communication current supplied by the transmitter 10 and to pass with little attenuation the frequency band of the communication current. The winding 33 of the element SF is connected across terminals HS1 and HS2, terminal HS1 being connected to ground through a capacitor 37 and terminal HS2 being connected to ground through a capacitor 38. The winding 33 is provided with an adjustable iron core 39 which is operatively connected by means not shown to an adjusting nut 40 (Fig. 2) placed in the front panel of the assembly TA to tune the filter SF. In this way the harmonic frequency components of the communication current are substantially suppressed to avoid the possibility of energy bearing the conversation from being picked up by nearby radio receivers and the communication is maintained private for the railroad.

By selecting the intermediate terminal of secondary winding 19 to which wire 36 of the line connection of transmitter 10 is connected, the energy level of the communication current supplied to the line wires can be selected, the parts being proportioned so that ordinarily only a portion of the secondary winding 19 is used. The emergency switch ES is a double-pole double-throw switch, and its handle 41 is wire sealed as indicated at 42 in Fig. 2 at the position of the switch illustrated in Fig. 7. A second position contact 43 of the switch ES is connected to the end terminal S30 of the secondary winding 19 and thus as the emergency switch ES is thrown to its second position the full secondary winding 19 is included in the connection of the transmitter to the line wires and the maximum output of the transmitter is applied to the transmitting channel. In this way a reserve source of power is available for the operator to supply an additional output of the transmitter 10 to the line wires, such additional power being ordinarily effective to permit communication to be carried on across gaps in the transmitting channel caused by a stretch of the line wires being down or one or more of the line wires being broken. At the second position of the emergency switch, a contact 44 closes a short circuiting path around the meter 22 to avoid the meter from being damaged when the full power is placed on the line wires.

The inputs of the two receivers 11 and 12 are coupled to the second pair of line wires L1 and L2 in multiple through an input transformer T4 of the assembly TA and capacitors 53 and 54 of the assembly TC. The input transformer T4 is provided with a middle or primary winding 56 and two secondary windings 45 and 49. The primary winding 56 is connected to the line wires L1 and L2 in multiple and ground and the secondary windings 45 and 49 are connected to the input of the receivers 11 and 12, respectively, and ground. To be explicit, the two capacitors 53 and 54 in series are connected across the terminals L1 and L2 of the unit which in turn are connected to the line wires L1 and L2. The junction terminal of the capacitors 53 and 54 is connected by wire 55 to terminal LC1 of assembly TA, terminal LC1 being in turn connected to one end terminal of the primary winding 56, the other end terminal of this winding being connected to ground at the terminals LC2 and G. Secondary winding 45 of the transformer T4 has one end terminal connected to terminal RC2, which in turn is connected to one input terminal of the receiver 11 by wire 46, the other end of the secondary winding 45 and the other input terminal of receiver 11 being connected to ground. Similarly, the secondary winding 49 of transformer T4 has one end connected to terminal RC4 which in turn is connected to one input terminal of the receiver 12 by wire 50, the other end of the secondary winding 49 and the other input terminal of the receiver 12 being connected to ground. Secondary winding 45 is bridged by a capacitor 47 and is provided with an adjustable iron core 48 for tuning the winding to the carrier channel frequency $f1$ to which the associated receiver 11 responds. Also the secondary winding 49 is bridged by a capacitor 51 and a resistor 58 and is provided with an adjustable iron core 52 for tuning the winding to the channel frequency $f2$ to which the receiver 12 responds. The iron cores 48 and 52 of the transformer are operatively connected by means not shown to adjustment nuts 59 and 60 in the front panel of assembly TA, and in this way the secondary windings are individually tuned so that the signal to noise ratio can easily be kept at a value necessary for improved reception.

It follows from the foregoing that communication current of the first channel frequency F1 caused to flow in the transmitting channel of the system and of which transmitting channel the line wires L1 and L2 are elements, is effectively applied to the receiver 11 through the connection including capacitors 53 and 54, and primary winding 56 of transformer T4 and ground, and to which connection there is coupled the connection including the secondary winding 45 of the input transformer and the input of receiver 11. Likewise, communication current of the second channel frequency $f2$ flowing in the transmitting channel is supplied to the receiver 12 through secondary winding 49.

Capacitors 27 and 28 are predetermined as part of the series tuned harmonic suppressor filter which must be series tuned to a frequency between the channel frequencies $f1$ and $f2$ so that the output carrier currents are correct for each channel. Capacitors 54 and 57 must be equal to 27 and 28 so as to not unbalance the line circuits. These capacitors also provide an insulating coupling to avoid the direct current and low frequency current used in the transverse circuits of the line wires from being applied to the train communication equipment.

To enable recording to be made of the conversation of the communication current of the system, the coupling unit CU is provided with the control relay assembly RA and the transformer assembly RT, together with the pair of telephone jacks J1 and J2.

It should be here pointed out that the station WS is provided with at least one recorder which may be of any one of several well-known forms. In Fig. 7 a station recorder is indicated by the dotted rectangle RC and this recorder is illustrated as being of the wax cylinder type, having a motor 61 powered from any convenient source and connected by a drive mechanism indicated by the dotted line to a recording cylinder 62. A stylus 63 presses against the cylinder 62 and is attached or otherwise actuated by an armature 64 of an electromagnet 65. The winding 66 of the electromagnet is attached to cord circuit 67 which is terminaled in a plug 68 adaptable of being inserted into either one of the jacks J1 and J2. The two jacks J1 and J2 of the unit CU are for use with the channel frequencies $f1$ and $f2$, respectively. Thus, when a recording of a conversation on the channel frequency $f1$ is desired, the plug 68 is inserted in the jack J1 and the plug is inserted in the jack J2 when it is desired to record a conversation on the channel frequency $f2$. Preferably the station WS would be provided with two recorders, one for use with the channel frequency $f1$ and one for use with the channel frequency $f2$, but in Fig. 7 only one recorder is shown since one recorder is sufficient for illustrating the invention.

Relays L and H of the relay assembly RA are provided for transfering the recorder from the receiver to the transmitter of the channel frequency being used. The relays L and H are controlled through the channel selector switch and the push-to-talk switch of the telephone equipment of the station. As explained in the aforementioned Bossart application, a selector switch is used for selecting the channel frequency to be used and a push-to-talk switch is used for two-way conversation. In Fig. 7, the selector switch is indicated at 69 and the push-to-talk switch is indicated at 70. When the selector switch 69 is set at its left-hand position for selecting the channel frequency $f1$ for use, a contact 71 is closed to prepare a circuit for energizing relay L, this circuit extending from an associated ground terminal G through wire 90, winding of relay L, terminal TR1 of the coupling unit, wire 72, contact 71 of the selector switch 69 and push-to-talk switch contact 70, to the terminal N32 of the current source. It should be here noted that in accordance with the usual practice the control power source for the communication equipment has its positive terminal connected to ground and its negative terminal connected to a terminal N32. When the selector switch 69 is set to the right-hand position for use of the channel frequency $f2$, a contact 73 of switch 69 is closed and a circuit is prepared for energizing relay H, the circuit including ground terminal G, wire 90, winding of relay H, terminal TR2, wire 74, contact 73, the push-to-talk switch 70, and the terminal N32. It follows that when the selector switch 69 is set for use of the channel frequency $f1$, the relay L is energized and deenergized according as the push-to-talk switch 70 is set for transmitting or for receiving, and when the selector switch 69 is set for use of the channel frequency $f2$, the relay H is energized or deenergized according as the push-to-talk switch is set for transmitting or for receiving.

The input of the transmitter 10 and the output of the receivers 11 and 12 are selectively connected to the jacks J1 and J2 through contacts of the relays L and H and transformers of the assembly RT. The transformer T1 of the assembly RT is provided with a primary winding 75 which is bridged across the output of receiver 11, one end of the winding 75 being connected to ground and its other end being connected to terminal CR1 which in turn is connected to one output terminal of the receiver 11. A potentiometer 76 is bridged across secondary 77 of transformer T1, one end terminal of winding 77 being grounded and an intermediate terminal 78 of the potentiometer 76 being connected to jack J1 over back contact 79 of the relay L. Similarly, a transformer T2 of the assembly RT is provided with a primary winding 80, one end of which is grounded and the other end of which is connected to terminal CR3, which in turn is connected to one output terminal of the receiver 12. A potentiometer 81 is bridged across secondary winding 82 of the transformer T2 and one end of the secondary winding 82 is grounded and an intermediate terminal 83 of the potentiometer 81 is connected to jack J2 over back contact 84 of relay H. It is to be noted that the output terminals of the receivers 11 and 12 are grounded, and also the second terminal of each of the jacks J1 and J2 is connected to ground through wire 90.

A third transformer T3 of the assembly RT is provided with a primary winding 85, one end of which is grounded and the other end of which is connected through a capacitor 86 to terminal M2 and thence to the input of the microphone circuit of the transmitter 10. A secondary winding 87 of transformer T3 has one end grounded and its other end connected to jack J1 or J2 according as relay L or relay H is energized, the connection to jack J1 including front contact 79 of relay L and the connection to jack J2 including front contact 84 of relay H.

Thus, if the selector switch 69 is set to the left-hand position for conditioning the telephone equipment for communication on the channel f1, a portion of the conversation received at station WS and appearing in the output of the receiver 11 is applied to transformer T1 and thence through the back contact 79 of relay L to jack J1 and from there it is applied to the recorder RC for recording, it being assumed of course that the plug 68 is inserted in jack J1. During the sending period from the station WS, the operator would close his press-to-talk switch 70 to energize the transmitter 10 and in so doing relay L is energized so that a portion of the voice frequency energy created by the operator speaking into the microphone of transmitter 10 is applied through tansformer T3 and front contact 79 of relay L to jack J1 to be impressed upon the recorder RC. When the selector switch 69 is set in the right-hand position to condition the telephone equipment for communication on the channel f2 and the recorder is plugged into jack J2, a portion of the conversation received at station WS and appearing in the output of the receiver 12 is applied to jack J2, through the transformer T2 and back contact 84 of relay H and thence to the recorder. During the sending period the push-to-talk button is closed and the voice frequency energy created in the microphone circuit of transmitter 10 is impressed upon jack J2 through transformer T3 and front contact 84 of relay H and thence to the recorder.

It is apparent that at wayside stations where recording of the conversation is not required or necessary, the assemblies RA and RT of the coupling unit may be omitted.

The adjustable terminals 78 and 83 of the potentiometers 76 and 81 are operatively connected as indicated by dotted lines in Fig. 7 to the adjustments 88 and 89 and the operator can readily set the potentiometer for the desired magnitude of the receiver output energy to be applied to the recorder. The output energy of the two receivers is adjusted by means of adjustments 88 and 89 to be equal to the microphone energy supplied to recorder RC.

A wayside coupling unit here disclosed has the advantages that the transmitter and receiver of the communication system are efficiently coupled to the line wires to provide a high order of energy transfer for both sending and receiving on either of the carrier channel frequencies used. The output at the station can be quickly checked to assure that the desired energy level is being sent out. The full power available at the transmitter can be used at times to enable the communication to be bridged around faults in the line circuit. Also, recording of both sides of the conversation on either of the carrier frequency channels can be made as desired.

Although we have herein shown and described but one form of a coupling unit for communication systems embodying our invention, it is understood that various changes and modifications may be made therein within the scope of the appended claims without departing from the spirit and scope of our invention.

Having thus described our invention, what we claim is:

1. In combination, a wayside station, a line wire extending from said station and forming an element of a transmitting channel due to its distributed impedance to ground, a transmitter of carrier communication current at said station, a transformer having a primary and a secondary winding at said station, said primary winding connected to the output of said transmitter, said secondary winding having an intermediate terminal as well as two end terminals, said primary and secondary windings being proportioned for the full output of said transmitter to be developed across the two end terminals of the secondary winding and a selected portion of the output of the transmitter to be developed across said intermediate terminal and a selected one of the end terminals, said selected one of said end terminals of the secondary winding connected to ground, a capacitor and a switch at said station, said switch having a first and a second position contact, circuit means including said capacitor and said first position contact of said switch to connect said intermediate terminal to said line wire whereby the portion of the secondary winding between the intermediate and said selected end terminal is effective to supply said selected portion of the output of the transmitter to the transmitting channel, and other circuit means including said capacitor and said second position contact of said switch to connect the non-selected end terminal of the secondary winding to said line wire whereby the full secondary winding is effective to supply substantially the full output of the transmitter to the transmitting channel.

2. In a communication system using modulated carrier current of a first and a second carrier frequency, a wayside station, a pair of line wires extending from said station and forming elements of a transmitting channel due to their distributed impedance to ground and their distributed impedance with each other, a first and a second receiver at said station, said first receiver responsive to a modulated carrier of a first frequency and said second receiver responsive to a modulated carrier of a second frequency, an input transformer at said station and provided with a primary winding and a first and a second secondary winding, a pair of capacitors in series connected across said line wires, said primary winding having one terminal connected to the junction terminal of said capacitors and another terminal connected to ground, said first secondary winding connected across the input of said first receiver and said second secondary winding across the input of said second receiver, and two other capacitors one connected across each of said secondary windings and said transformer provided with two adjustable magnetic cores one for each of the secondary wiindings to enable each secondary winding to be individually tuned to the carrier frequency of the respective receiver.

3. In a communication system using carrier telephone current, the combination of, a station having a transmitter and a receiver, said transmitter including an oscillator which is operable to supply a given carrier current, a microphone circuit including a microphone connected to the input of said transmitter for modulating said carrier current by the voice frequencies impressed upon the microphone, said receiver including a demodulator which is responsive to carrier telephone current to reproduce the voice frequencies in the output of the receiver, a pair of terminals, a recorder at said station and including means to record voice frequencies, said recorder having a cord circuit which at times connects the recorder to said pair of terminals, a first and a second transformer at said station and each transformer having a primary and a secondary winding, said primary winding of said first transformer coupled to said microphone circuit to receive voice frequency energy, said primary winding of said second transformer connected across the output of said receiver to receive voice frequency energy, a push-to-talk switch having a sending and a receiving position and a control relay at said station, circuit means including the push-to-talk switch connected to a winding of said control relay to operate the relay to a first or a second position according as the push-to-talk switch is set at its sending or at its receiving position, means including first position contacts of said relay to connect said secondary winding of said first transformer across said pair of terminals, and means including second position contacts of said relay to connect said secondary winding of said second transformer across said pair of terminals.

4. In a communication system using carrier telephone current of either a first or a second carrier frequency, the combination of, a station having a transmitter and a first and a second receiver, said transmitter to supply carrier current of either said first or second carrier frequency, a microphone circuit including a microphone connected to said transmitter for modulating with voice frequencies the carrier that is being supplied by the transmitter, said first and second receiver responsive to carrier telephone current of said first and second carrier frequency respectively to reproduce voice frequencies in their output, a recorder at said station and including means for recording voice frequencies, said recorder having a cord circuit with a plug contact, a first and a second jack each having a pair of terminals formed to receive said plug contact; a first, a second and a third transformer each of which has a primary and a secondary winding; said primary winding of said first transformer coupled to said microphone circuit, said primary windings of said second and third transformers coupled to the output of said first and second receiver respectively, a selector switch having a first and a second position, a push-to-talk switch having a sending and a receiving position, a first and a second control relay each operable to a first and a second position, circuit means including contacts of said selector switch and contacts of said push-to-talk switch to selectively operate said first and second relays, means including first position contacts of said relays to connect the secondary winding of the first transformer to the terminals of said first or second jack according as said first or second relay is operated to its first position, means including a second position contact of said first relay to connect the secondary winding of said second transformer to the terminals of said first jack, and means including a second position contact of said second relay to connect the secondary winding of said third transformer to the terminals of said second jack.

EDGAR W. BREISCH.
KENNETH E. DORIOT.

REFERENCES CITED

The following references are of record in the file of this patent:

UNITED STATES PATENTS

| Number | Name | Date |
|---|---|---|
| 1,442,130 | Currier | Jan. 16, 1923 |
| 2,082,185 | Sorensen | Oct. 12, 1937 |
| 2,124,709 | Phebus | July 26, 1938 |
| 2,131,388 | Place | Sept. 27, 1938 |
| 2,442,851 | Halstead | Sept. 10, 1946 |

FOREIGN PATENTS

| Number | Country | Date |
|---|---|---|
| 532,589 | France | Nov. 17, 1921 |